United States Patent [19]

Hirano et al.

[11] Patent Number: 4,792,003
[45] Date of Patent: Dec. 20, 1988

[54] SPAN ADJUSTING DEVICE FOR WEIGHER

[75] Inventors: Takashi Hirano, Kobe; Michio Taguchi, Tatsuno, both of Japan

[73] Assignee: Yamato Scale Company, Limited, Japan

[21] Appl. No.: 30,704

[22] Filed: Mar. 26, 1987

Related U.S. Application Data

[62] Division of Ser. No. 822,906, Jan. 27, 1986, Pat. No. 4,703,815.

[51] Int. Cl.$^4$ .................... G01G 19/40; G01G 19/52; G01G 23/14
[52] U.S. Cl. .................................. 177/25.14; 177/50; 177/164
[58] Field of Search ...................... 177/25, 14, 50, 164

[56] References Cited

U.S. PATENT DOCUMENTS 4,310,893  1/1982  Loshbough .................. 177/50 X
4,535,857  8/1985  Haze ............................. 177/50

Primary Examiner—George H. Miller, Jr.
Attorney, Agent, or Firm—Senniger, Powers, Leavitt and Roedel

[57] ABSTRACT

An automatic span adjusting device incorporated in a weigher for correcting deviation of the weight signal provided by the weigher from the true weight of product being weighed by the weigher, the device including a memory storing weight values of a plurality of reference weights for span correction and means for automatically reading one of the stored weight values from the memory to provide it for calculating a span correction coefficient.

5 Claims, 6 Drawing Sheets

SPAN ADJUSTING DEVICE FOR WEIGHER

This is a division of application Ser. No. 822,906, filed Jan. 27, 1986, U.S. Pat. No. 4,703,815.

BACKGROUND OF THE INVENTION

This invention relates to an improved automatic span correcting device for weighers. The inventive device is especially useful when incorporated in a so-called combination weighing machine.

In a weigher having a digital indicator, the digital value on the indicator does not always coincide with the digital value which corresponds to the analog weight of product put on the weighing cradle of the weigher. For example, assume a digital value of "1000" on the indicator is to correspond to an analog weight of "100 grams". If the analog output of the weigher is converted by an analog to digital converter into a digital value of "1010" when the weigher is loaded with product of 100 gram weight, the digital value must be corrected to "1000". Such correction is referred to as "span correction" in the field of weighing equipments. This invention relates to a device for automatically effecting such correction.

The opened Japanese patent specification No. 58-95220 discloses a method of effecting such span correction. In this method, a weigher is first zero-corrected in its unloaded state. Then, the weigher is loaded with a reference test weight having a known weight value and the resultant weight signal is divided by the known weight value to obtain a span correction coefficient which is stored in a register. Thereafter, any weight signal output from the weigher is multiplied by this coefficient to obtain a corresponding span-corrected value of the weight.

In this method, however, in order to obtain accurate measurements the reference test weight must be sufficiently high and the test weight must be changed when the weight of the product is changed, in order to obtain accurate measurements. However, it is troublesome and time-consuming to manually input the weight value of each test weight every time and this problem is especially severe in a combination weighing machine having a number of weighers.

SUMMARY OF THE INVENTION

Accordingly, an object of this invention is to provide an improved span correcting device which can automatically provide the weight value of any test weight put on the weigher to calculate the corresponding span correction coefficient.

As is known in the art, the span correction coefficient varies with lapse of time due to various factors such as contamination and temperature change and must be frequently calibrated to maintain the accuracy of the measurement. However, it is uneconomical to use expensive reference test weights and effect time-consuming calibration with these test weights.

Accordingly, another object of this invention is to provide an improved span correcting device which can automatically detect an unallowable deviation of the span correction coefficient and compensate for this deviation.

In accordance with a feature of this invention, there is provided a device comprising a load detector coupled to the weigher for producing a weight signal indicative of the weight of product put on the weigher, a first memory for storing the nominal weight values of a plurality of reference test weights, a second memory for storing boundary weight values corresponding respectively to the nominal weight values stored in the first memory, means for reading out of the first and second memories the corresponding weight values as a pair in the order of magnitude, means for producing an output signal when the weight signal from the load detector falls between the boundary weight values read out currently and precedingly from the second memory to deliver the nominal weight value currently read out from the first memory, means for calculating a span correction coefficient from said weight signal and said delivered nominal weight and storing the same for use.

In accordance with another feature of this invention, the device further comprises a check weight to be loaded on the weigher, means for storing the span-corrected measured weight value of the check weight, means for providing an alarm signal when the span-corrected measured weight deviates unallowably from the stored weight value, means for calculating a new span correction coefficient from the current span-corrected measured weight value of the check weight and the stored weight value in response to the alarm signal and correcting the previously stored span correction coefficient with the new coefficient.

These and other objects and features of this invention will be described in more detail below with reference to the accompanying drawings.

DETAILED DESCRIPTION OF PREFERRED EMBODIMENTS

Figure 1:
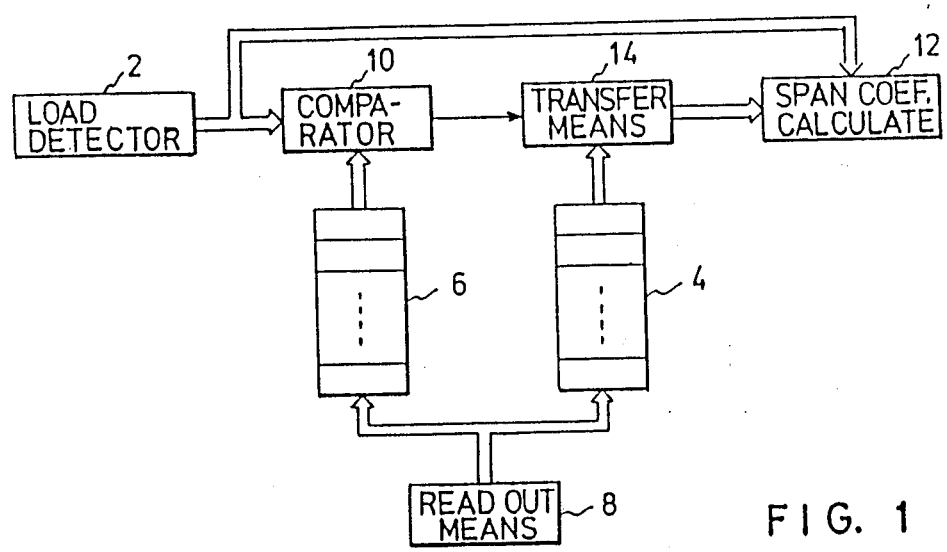
FIG. 1 is a block diagram representing an automatic span correcting device for weighers according to this invention.

As shown in FIG. 1, the device of this invention includes a load detector 2, such as weigher, for weighing product and producing a weight signal indicative of the weight of the product, a first memory 4 for storing nominal weight values of a plurality of reference test weights; and a second memory 6 for storing boundary weight values corresponding respectively to the nominal weight values stored in the first memory 4. The weight values stored in both the first and second memories 4 and 6 form corresponding sequential pairs in order of magnitude and these pairs are read out sequentially from the memories 4 and 6 by read-out means 8. A comparator 10 compares the weight signal from the load detector 2 with two sequentially adjoining boundary weights from the second memory 6 and produces an output signal when the weight signal falls between the current boundary weight and the preceeding boundary weight. Transfer means 14 supplies the current weight value from the first memory 4 to a span correction coefficient calculating means 12 in response to the output signal from the comparator 10. A span correction coefficient is calculated from the weight signal supplied by the load detector 2 and the current weight value read out of the first memory 4.

Figure 2:
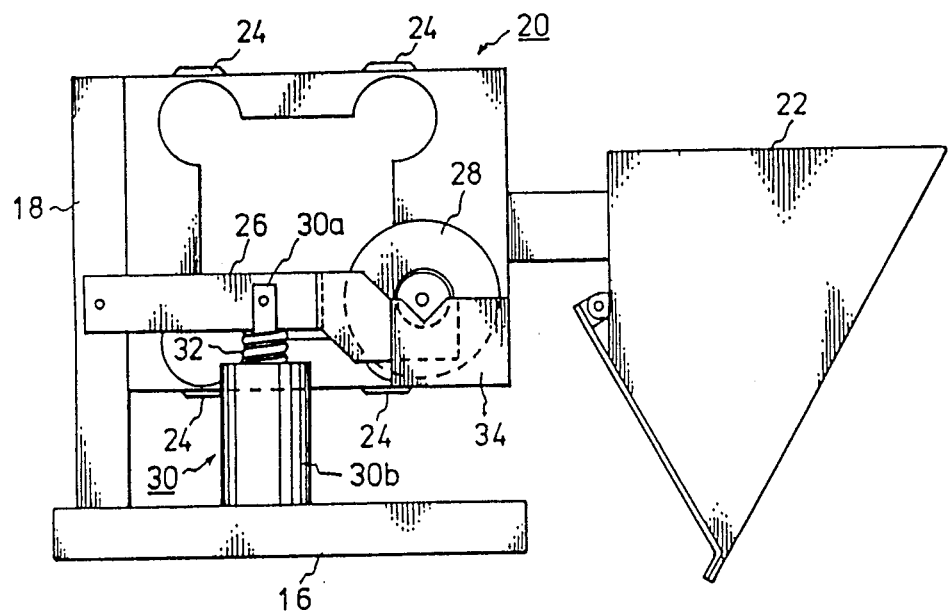
FIG. 2 is a front view representing a first embodiment of the device of this invention.
Figure 3:
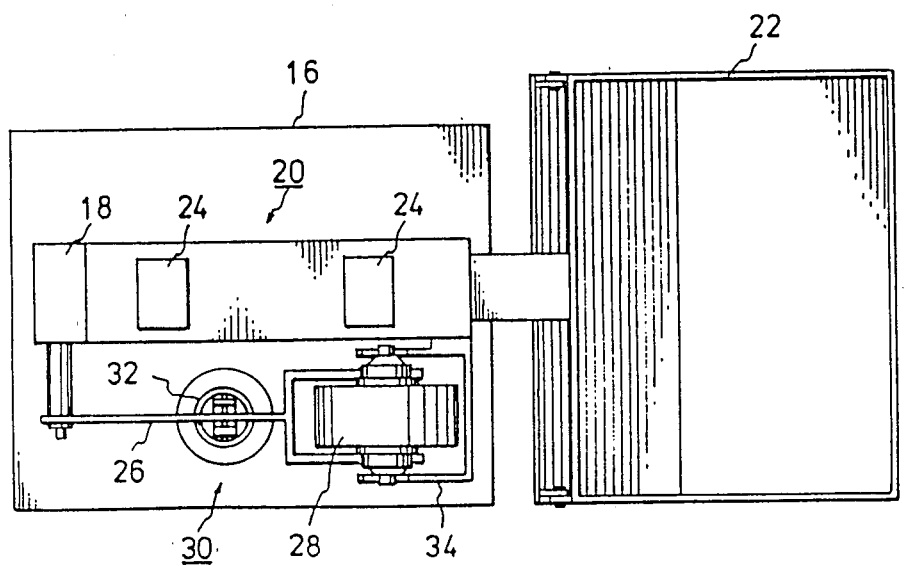
FIG. 3 is a plan view representing the first embodiment.

Referring next to FIGS. 2 and 3, a first preferred embodiment of the device of this invention includes a load cell 20 fixed at an end to a support bracket 18 which stands erect on a base 16. A weighing hopper 22 is coupled to the other end of the load cell 20. Strain gauges 24 are attached to four flexures of the load cell 20 for detecting deflection thereof to produce an analog weight signal indicative the weight of product placed in the hopper 22.

A support arm 26, an end of which is pivoted at a midpoint of the bracket 18 and the other end of which is forked to support a reference check weight 28, is disposed on one side of and along the load cell 20. The support arm 26 is coupled at its midpoint to a plunger 30a of an air cylinder 30 disposed on the base 16. A coiled spring 32 is disposed between the support arm 26 and a cylinder casing 30b for urging upward the support arm 26 and thus supporting the check weight 28. A V-shaped receptacle 34 is disposed in the side of the load cell 20 so that the receptacle makes no contact with the check weight 28 when the arm 26 is urged upward by the spring 32 and the receptacle supports the arm 26 when it is pulled down by the air cylinder 30. Accordingly, actuation of the cylinder 30 pulls down the support arm 26 against the coiled spring 32 and results in loading of the load cell 20 with the check weight 28 and deactuation thereof causes the spring 32 to raise the arm 26 and results in unloading of the check weight 28.

Figure 4:
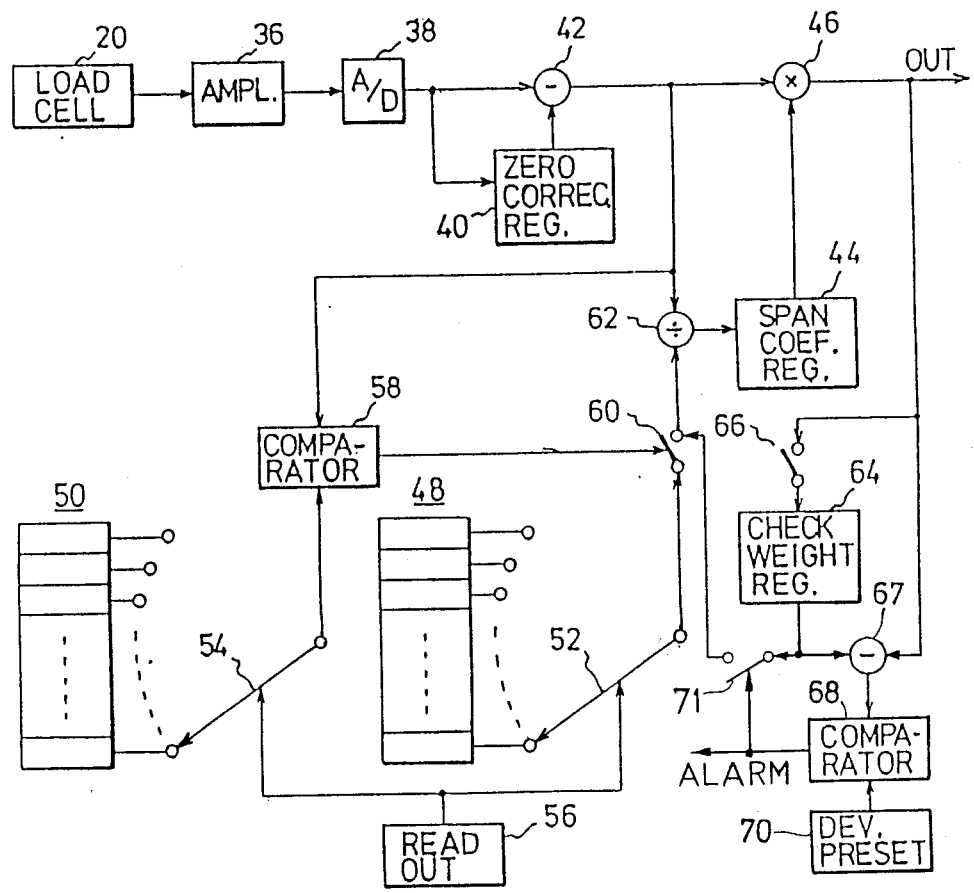
FIG. 4 is a block diagram representing a scheme of the first embodiment.

As shown in FIG. 4, the analog weight signal from the load cell 20 is amplified by an amplifier 36 and then converted by an analog-to-digital (A/D) convertor 38 into a digital weight signal. A zero correction register 40 stores a digital value of weight read therein when the load cell 20 is unloaded. This digital value is subtracted by a subtracter 42 from the current output of the A/D convertor 38 to effect zero correction of the digital weight signal. This zero-corrected digital weight signal is applied to a multiplier 46 and multiplied therein by a span correction coefficient supplied by a span correction coefficient register 44. An output weight signal of the multiplier 46, which has thus been span-corrected, may be supplied to a utilization device such as digital indicator. The scan correction coefficient stored in the register 44 is calculated automatically, as described below.

In the embodiment of FIG. 4, first and second weight memories 48 and 50 correspond, respectively, to the first and second memories 4 and 6 of FIG. 1, and comparator 58 and controlled normally open switch 60 correspond, respectively, to the comparator 10 and transfer means 14 of FIG. 1. Also, the span correction coefficient calculator 12 and read-out means 8 of FIG. 1 correspond, respectively, to divider 62 and read-out device 56 of FIG. 4.

The first weight memory 48 has a plurality of memory cells in which are stored the nominal weight values of a plurality of corresponding reference test weights in order of increasing weight. For example, if the stored weights are $S_0, S_1, S_2, \ldots S_{10}$, they may be 0 gram, 100 grams, 200 grams, . . . 1000 grams, respectively. The second weight memory 50 also has a plurality of memory cells in which are stored the boundary weight values of sequentially adjoining ranges of corresponding test weights. For example, if the boundary values are $D_0, D_1, D_2, \ldots D_9$ when the test weights are specified as above, they may be 50 grams, 150 grams, 250 grams, . . . 950 grams, respectively.

The weight values stored in the memories 48 and 50 are sequentially read out in the order of increasing weight by change-over switches 52 and 54 which are synchronously controlled by the read-out device 56, and are applied to normally-open switch 60 and comparator 58, respectively.

The comparator 58 compares the zero-corrected weight signal from subtracter 42 with the boundary weight read out from memory 50 and, when the former becomes less than the latter, provides an output signal for closing switch 60. Thus, the nominal weight value read out at that time from memory 48 to switch 60 is transferred to divider 62. When the content of memory 50 is read out in the increasing order of weight, the zero-corrected weight signal of any test weight put in weighing hopper 22 meets at divider 62 its nominal weight value from memory 48. The divider 62 divides the nominal weight value from memory 48 by the zero-corrected digital weight signal from subtracter 42 which is a span-uncorrected weight to provide a span correction coefficient for the corresponding range of weight, which is in turn stored in a correction memory such as span correction coefficient register 44. Therefore, when the test weight is removed from the hopper 22 and any product having weight within this range of weight is charged in the weighing hopper 22, the corresponding weight signal is multiplied in a multiplier 46 by the coefficient stored in register 44 and thus span-corrected weight signal is output for utilization.

As aforementioned the span correction coefficient varies with the surrounding condition such as temperature. Therefore, it is desired to check the accuracy of this coefficient stored in register 44 occasionally. Elements 64 to 71 shown in FIG. 4 are provided for this purpose. After completing initial calibration including storage of the span correction coefficient in register 44, the check weight loading mechanism as described with reference to FIGS. 2 and 3 is actuated to load the load cell 20 with the check weight 28. A switch 66 is then closed to store the span-corrected weight value in a reference memory such as check weight register 64. The above-mentioned operations complete calibration and are preferably effected by the machine manufacturer before shipment to the user. When the user desires to check the accuracy of the span correction coefficient stored in register 44 after some length of time, the check weight 28 is applied again to the load cell 20 after the weighing hopper 22 has been emptied. This results in the application of the span-corrected weight output of the check weight 28 to a subtracter 67 which calculates the deviation of the current output of multiplier 46 from the content of check weight register 64 (which was previously stored during calibration). The deviation is compared by a comparator 68 with a predetermined threshold value preset in an allowable deviation register 70 which produces an alarm signal when the deviation exceeds the threshold value. The alarm signal drives a suitable alarm device (not shown) and also closes a normally-open switch 71 to supply the content of register 64 to divider 62. A new span correction coefficient is then calculated by supplying to divider 62 the current (span-uncorrected) weight value of the check weight from the subtractor 42 and its original weight value stored in the register 64 during calibration. This new span correction coefficient is supplied by divider 62 to span coefficient register 44 thus correcting the span correction coefficient stored therein.

Figure 5:
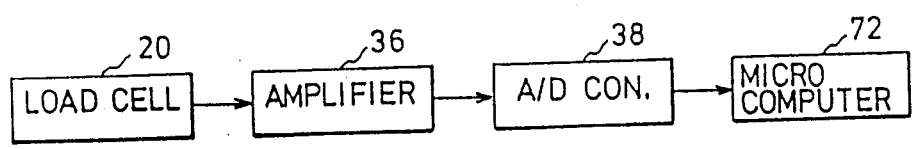
FIG. 5 is a block diagram representing a scheme of a second embodiment of this invention.
Figure 6:
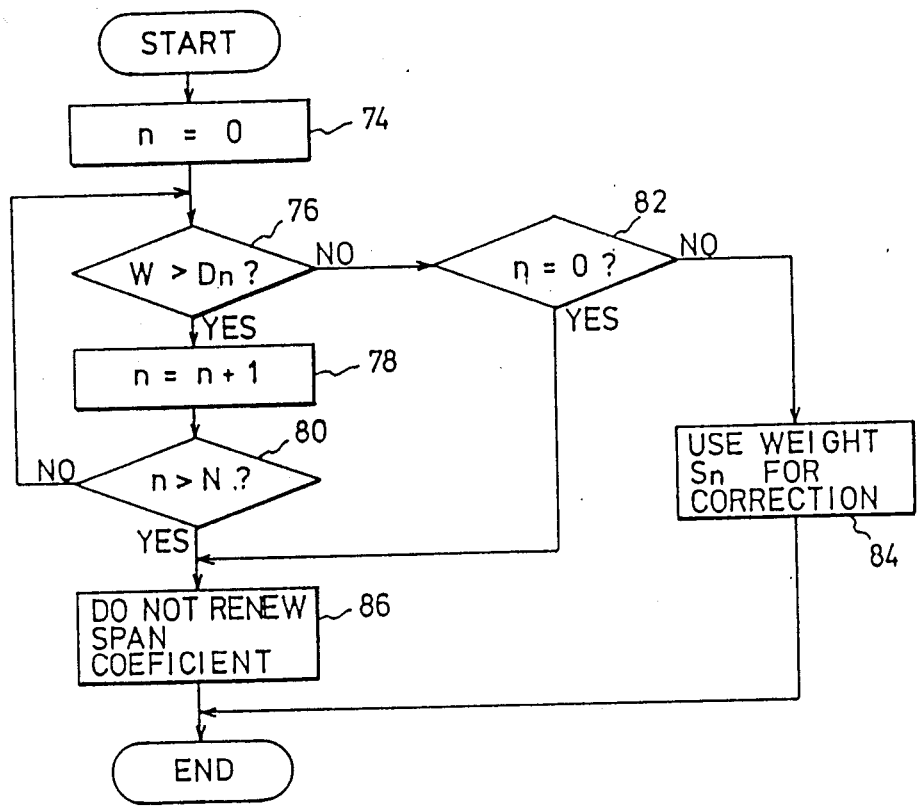
FIG. 6 is a flow chart representing a program for the second embodiment.

FIGS. 5 and 6 show a second embodiment of this invention, in which a microcomputer is substituted for the circuitry of FIG. 4 after A/D convertor 38. As shown in FIG. 5, the digital weight signal from A/D convertor 38 is supplied to a microcomputer 72 and processed therein. Now, an exemplary program of operation will be described below with reference to FIG. 6. It is assumed, in this case, that the reference test weight values $S_0, S_1, S_2, \ldots S_n$ and their boundary weights $D_0, D_1, D_2, \ldots D_N$ are previously stored in the computer 72. It is further assumed that the output of A/D convertor 38 has already been zero-corrected and the zero-corrected value is "W".

In the first step 74, a counter included in computer 72 for counting the value of "n" is reset to "0". Next, it is inquired whether the value W is greater than $D_n$ (at first, $D_n = D_0$) or not, in step 76. If "YES", that is, if $W > D_n$, the count of the n-counter is increased by one in step 78 and it is inquired, in step 80, whether "n" is greater than "N" or not. If "NO", that is, if $n < N$, steps 76, 78 and 80 are repeated. During this repetition with successive increments of "n" the value of W will become less than $D_n$ and the process will move from step 76 to step 82. In step 82, it is inquired whether the count "n" is equal to zero or not and, if "NO", the value $S_n$ is specified for use in span cor rection in step 84. If the answer in step 80 or 82 is "YES", renewal of the span correction coefficient is inhibited in step 86.

Figure 7:
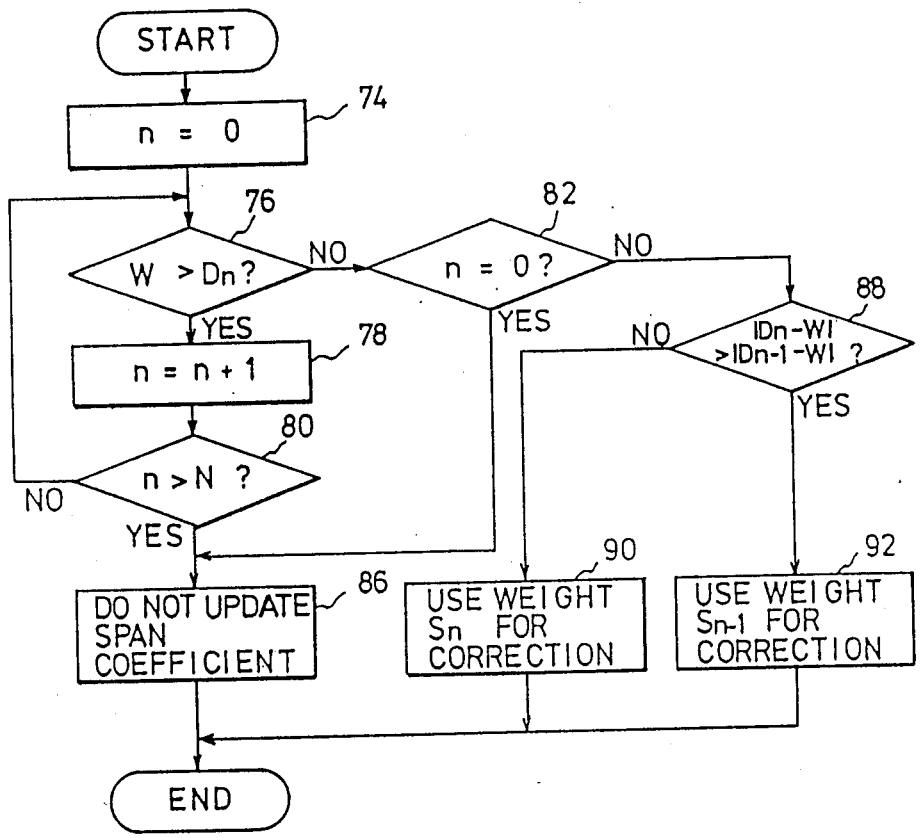
FIG. 7 is a flow chart representing a program for a third embodiment of this invention.

Another exemplary program of operation of the embodiment of FIG. 5 is shown in FIG. 7. In this case, the values $S_0, S_1, \ldots S_n$ are equal to $D_0, D_1, \ldots D_N$, respectively, in contrast to the case of FIG. 6 in which they are unequal. In FIG. 7, therefore, if the answer in step 82 is "NO" it is inquired, in step 88, whether the absolute difference between W and $D_n$ is greater than the absolute difference between W and $D_{n-1}$ or not. If the answer in step 88 is "NO", the weight $S_n$ is specified for span correction in step 90, while if the answer is "YES" the weight $S_{n-1}$ is specified in step 92. The other steps are similar to those of FIG. 6.

Figure 8:
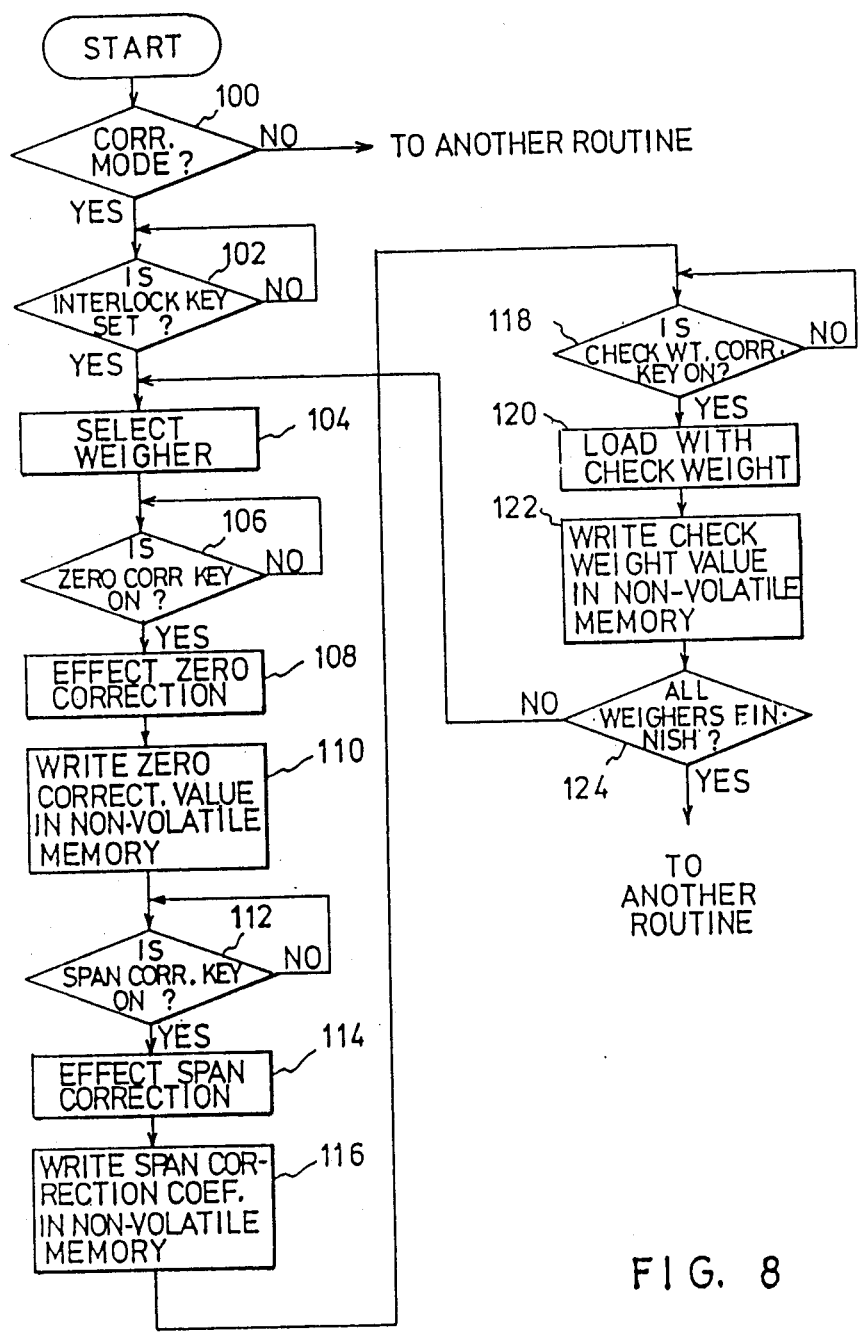
FIG. 8 is a flow chart representing a program for correction mode of a fourth embodiment of this invention.
Figure 9:
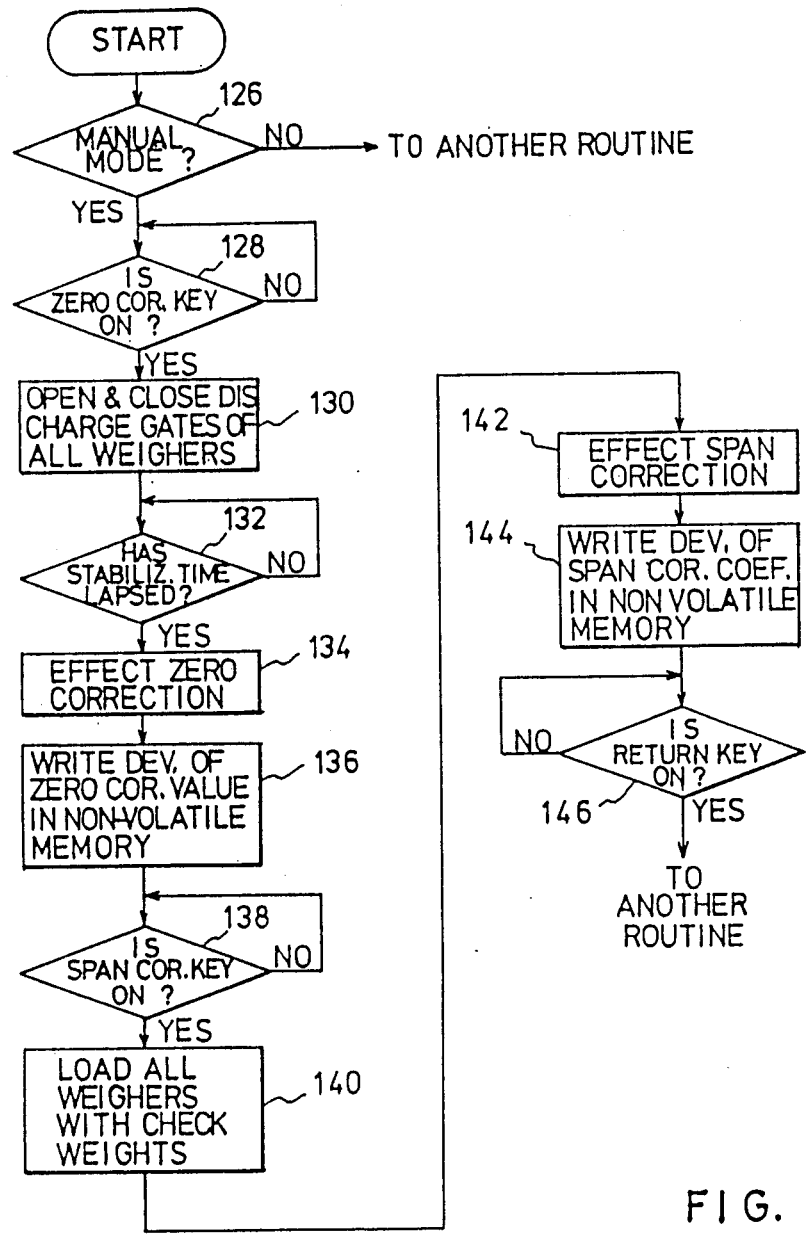
FIG. 9 is a flow chart representing a program for manual mode of the fourth embodiment.

Two further exemplary programs are shown in FIGS. 8 and 9. These programs are preferably used when the embodiment of FIG. 5 is incorporated in a combination weighing machine which may include several weighers. FIG. 8 is a flow chart of correction mode operation which is executed, for example, before shipment of the machine and FIG. 9 is a flow chart of manual mode operation which is executed, for example, before starting operation of the machine.

In the correction mode of FIG. 8, it is first inquired, in step 100, whether the device is set in correction mode or not. If "YES", it is further inquired, in step 102, whether the interlock key is set or not and, if "YES", one of the weighers to be corrected is selected in step 104. Then, it is inquired, in step 106, whether the zero-correction key is on or not and, if "YES", zero correction is effected in step 108. In the next step 110, the corrective value used for the zero correction is written in a non-volatile memory in the microcomputer 72 and, thereafter, a proper reference test weight is put on the weigher.

In step 112, it is inquired whether the span correction key is on or not and, if "YES", span correction is effected in step 114. The span correction may be effected in accordance with the program of FIG. 6 or 7 and it will not be described further. In step 116, the span correction coefficient obtained in step 114 is written in the non-volatile memory and the test weight is manually removed.

Then, it is inquired, in step 118, whether the check weight correction key is put on or not and, if "YES", the weigher is loaded with a check weight attached to the weigher in step 120. The resultant measured weight is written in the non-volatile memory in step 122. Then, it is inquired, in step 124, whether all the weighers of the machine hve finished correction or not. If "NO", the program is returned to step 104 and, if "YES", it moves to another routine.

In the manual mode of FIG. 9, it is first inquired, in step 126, whether the device is set in manual mode or not. If "YES", it is further inquired, in step 128, whether the zero correction key is put on or not. If the answer is "YES", the discharge gates of all weighers are opened to empty all weighers and then closed and it is inquired, in step 132, whether the time for stabilization has lapsed or not. After this time has lapsed, zero correction is effected in step 134. Next, in step 136, the deviation of the corrective value used in this zero correction from the corrective value previously stored in the non-volatile memory during the operation of correction mode is written in the non-volatile memory. Thereafter, the sum of the corrective value for zero correction in correction of the corrective value for zero correction in correction mode stored in the non-volatile memory and the deviation of corrective value stored in the non-volatile memory is used as the corrective value for zero correction.

Next, in step 138, it is inquired whether the span correction key is on or not and, if "YES", all the weighers are loaded with the attached check weights in step 140 and span correction is effected in step 142. In step 142, a span correction coefficient corresponding to the check weight loaded in step 140 is calculated and its deviation from the corresponding span correction coefficient in correction mode is further calculated. The resultant deviation is written in the non-volatile memory in step 144. Thereafter, the sum of the span correction coefficient stored in the non-volatile memory and the deviation of coefficient stored in the non-volatile memory is used as the span correction coefficient. It is inquired, in step 146, whether the return key is on or not and, if "YES", the process moves to another routine.

What is claimed is:

1. An automatic span correcting device for a weigher, comprising a load detector coupled to said weigher for providing a weight signal indicative of the weight of product placed on said weigher, arithmetic means for calculating a span correction coefficient from said weight signal and nominal weight value of said product, correction memory means for storing said calculated span correction coefficient, and a multiplier for multiplying said weight signal by the calculated span correction coefficient to effect span correction; wherein said device further comprises reference memory means for storing a reference output value of said multiplier resulting from previously placing a check weight on the weigher, means for generating an alarm signal when the deviation between the value of said multiplier output corresponding to the check weight and the reference output value exceeds a predetermined value, means responsive to said alarm signal for supplying the reference output value to said arithmetic means for causing it to calculate a new span correction coefficient from said reference output value and said weight signal corresponding to the check weight, and means for correcting the calculated span correction coefficient stored in said correction memory means with said new span correction coefficient.

2. The automatic span-correcting device of claim 1 wherein said correction memory means comprises a span coefficient register.

3. The automatic span-correcting device of claim 1 wherein said means for generating comprises a subtracter for subtracting the difference between the value of said multiplier output when only the check weight is currently applied to the weigher and the reference output value, and a comparator for comparing the subtracted difference to the predetermined value.

4. The automatic span-correcting device of claim 1 wherein the predetermined value is stored in a deviation register.

5. A method of calibrating a span correcting device for a weigher, which stores a span correction coefficient calculated previously, comprising the steps of:

storing a span-corrected output reference weight value previously obtained by placing a check weight on said weigher; placing, at a later time of checking the span correction coefficient, the check weight on said weigher; comparing the current span-corrected weight signal value from said placing step with said reference weight value stored previously; calculating, when the deviation between the compared values is greater than a predetermined value, a new span correction coefficient from said reference weight value and the current span-uncorrected weight signal value and correcting said stored span correction coefficient based upon said calculated new span correction coefficient.

* * * * *